Dec. 26, 1944.　　　　D. A. WILBUR　　　　2,366,076
FREQUENCY INDICATING SYSTEM
Filed Aug. 19, 1941
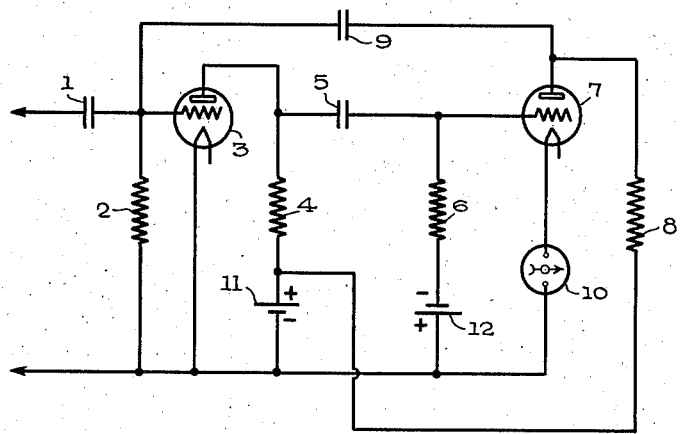
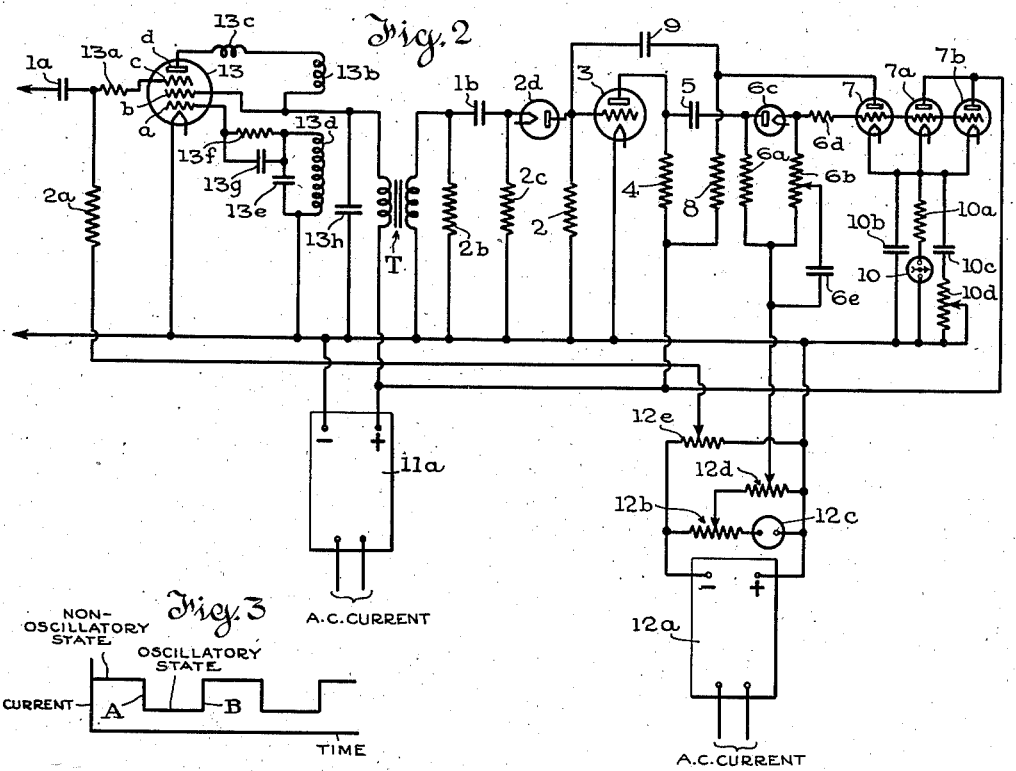
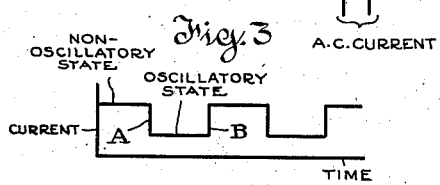
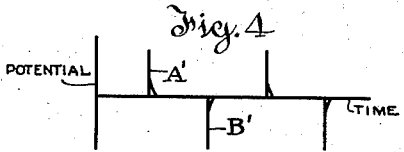
Inventor
Donald A. Wilbur
Attorneys Patented Dec. 26, 1944

2,366,076

UNITED STATES PATENT OFFICE 2,366,076

FREQUENCY INDICATING SYSTEM

Donald A. Wilbur, Troy, N. Y., assignor to W. & L. E. Gurley, Troy, N. Y., a corporation of New York Application August 19, 1941, Serial No. 407,503

2 Claims. (Cl. 175—368)

This invention relates to frequency indicators and in particular to arrangements for measuring the frequency of periodic variations of electric currents.

The frequency indicator of the present invention is of the "electronic" type employing vacuum tubes. Electronic frequency indicators have already been devised which employ "thyratron," "grid-glow" and other types of gaseous discharge tubes, sometimes referred to as "trigger" type of tubes. Such indicators depend for their action upon the periodic starting and stopping of the gaseous discharge through the tube under the control of the current whose frequency is to be measured. These prior frequency measuring devices are not entirely satisfactory due to the fact that thyratron and other gaseous types of tubes deteriorate rather rapidly when used at high frequency, and their characteristics alter markedly and necessitate continual compensation. Furthermore, in the use of such "trigger" type of devices involving a gaseous discharge, it is necessary to recondition or restore the tube after each conducting operation so the tube will be in condition for the next cycle of operation.

The present invention involves an electronic frequency indicator which employs vacuum tubes of the high-vacuum, pure-electron discharge type having characteristics which remain constant over long periods of time and are unaffected by the frequency of the signals applied to them. Furthermore, such tubes do not require the resetting or restoring operation which is essential to the operation of tubes of the thyratron or "trigger" type.

The present invention also permits a straight line or proportional relation between the instrument reading and the applied signal frequency, or if desired a rising or falling or otherwise varied characteristic may be obtained.

Generally stated, the invention involves a vacuum tube oscillator which normally is in a non-oscillatory state but is caused to execute one complete oscillation per cycle of applied signal or periodic current. The amplitude of this oscillation, once started, is independent of the amplitude of the controlling signal and causes a unidirectional pulse or charge to flow through an indicating meter. Thus the total charge per second, or the average value of the current through the meter is dependent upon the frequency of the controlling signal and is used as an indication of that frequency.

If the unidirectional pulses or charges are uniform, the meter indication will be in direct proportion to the frequency of the applied signal or current. The charges can, however, be made to vary gradually as the frequency varies, in which case the characteristic of the meter is modified.

The invention will now be described by reference to the accompanying drawing in which Figure 1 is a diagram illustrating the basic circuit to which the invention is applied;

Figure 2 is a diagram showing the circuit embodying the invention. This circuit is characterized by high stability when powered from a source of alternating current and includes means for varying the characteristics of the indication with reference to the frequency of the applied signal;

Fig. 3 is a curve illustrating variations in the direct current component of the plate current of controlled oscillator of Fig. 2;

Fig. 4 illustrates pulses produced by the varying current illustrated in Fig. 3.

In the arrangement shown in Figure 1, the periodic current to be measured is supplied to the input circuit which includes a condenser 1 and a resistance 2 connected in series. The voltage variations produced across resistance 2 are applied between the cathode and the grid of tube 3. The plate circuit of tube 3 includes a coupling resistance 4 and a suitable source of plate current indicated by the battery 11. A coupling condenser 5 and a resistance 6 are provided for transmitting to the grid of tube 7 current pulses developed by current changes in the plate circuit of tube 3. A battery 12 is included in circuit with resistance 6 for normally maintaining the grid of the tube 7 sufficiently negative with respect to the cathode of this tube to prevent flow of current through tube 7 when a static condition obtains. Plate current for tube 7 is supplied from battery 11 through a resistance 8. A condenser 9 provides a suitable back-coupling from the plate element of tube 7 to the grid element of tube 3. A suitable indicating instrument 10 is included in the cathode circuit of tube 7 to indicate the average value of the plate current, and while this instrument has been shown connected in the lead to the cathode element, it might be connected in the lead to the anode or plate element. It will be understood that both tubes 3 and 7 are of the high-vacuum, electron current type.

In operation of the arrangement of Figure 1, when a negative potential is applied by the signal through condenser 1 and across resistor 2 to the grid of vacuum tube 3, this causes a reduction of current through the tube and consequently through resistor 4, thereby increasing the plate potential of tube 3. The increased plate potential causes a charging current to flow to condenser 5 through resistor 6, and the potential drop across resistor 6 acts to decrease the negative potential applied to the grid of tube 7 from battery 12. In other words, a negative impulse applied to the grid of tube 3 causes a decrease in the negative potential applied to the grid of tube 7. This results in a flow of current through tube 7 and resistor 8 thereby reducing the potential on the plate of tube 7 which causes condenser 9 to discharge through resistor 2. The potential drop across resistor 2 applies a negative potential to the grid of tube 3. This negative potential produces the same action in tube 3 and in the remainder of the circuit as the potential originally applied from the input circuit, continuing the action initiated by the input signal. This action continues independently of the existing value of the applied input signal, decreasing the current in tube 3 and increasing the current in tube 7 until further change in the currents of these two tubes is prevented by the operating characteristics of the tubes and associated circuits. As the current in tube 3 decreases towards its limiting value, the charging of condenser 5 through resistor 6 decreases and thereby decreases the potential on the grid of tube 7 which causes a decrease in the current in this tube and thereby initiates a reverse operation which continues until the plate current in tube 7 is reduced to zero. Battery 12 prevents current flow in tube 7 until another signal of proper polarity is applied to tube 3 from the input circuit. Thus, a unidirectional pulse or charge is passed through meter 10, the amount of this charge being determined by the operating characteristics of the circuit and not by the amplitude of the input signal. This action will be repeated for each negative pulse of input signal applied to the grid of tube 3 and thus the total charge per second, or the average current passing through meter 10 is dependent upon the frequency of the applied signal. Any averaging type of current meter may be used for meter 10 and its reading may be used as a measure of the frequency of the applied signal.

Figure 2 is a circuit diagram showing the invention, and is an improvement on the circuit arrangement shown in Figure 1 designed to give high stability when energized from a source of alternating current. Various elements shown in Figure 2 which correspond to similar elements shown in Figure 1 are represented by the same reference numerals. As will be seen, the basic pulsing circuit is represented by the elements 2—3—4—5—6a—6b—6c—7—8—9—10.

In this arrangement the element corresponding to resistance 6 in Figure 1 is replaced by two resistance elements 6a and 6b connected on opposite sides of a rectifier 6c included in series in the connection between condenser 5 and the grid of tube 7. A high resistance 6d is included between the rectifier 6c and tube 7 to prevent appreciable lowering of the input impedance of tube 7 in case the input potential should become large enough to cause electron flow from the grid of tube 7 or from the grids of the tubes which have their grid-cathode circuits connected in parallel with that of tube 7.

The plate currents for tubes 3 and 7 are supplied by rectifier 11a which is energized from an alternating current source. The biasing current for tube 7 is supplied from rectifier 12a which may be energized from the same alternating current source that supplies rectifier 11a. The output of rectifier 12a is bridged by a circuit including a potentiometer resistance 12b connected in series with a two-electrode glow discharge tube 12c. A second potentiometer resistance 12d is connected at one end to the variable tap on potentiometer 12b and the other end is connected to shunt tube 12c as shown. The lead for supplying biasing current to tube 7 through resistor 6b is connected to the variable tap on potentiometer 12b.

For the purpose of producing a greater current through meter 10, a pair of additional vacuum tubes 7a and 7b are connected with their cathodes and grid elements arranged in parallel with the cathode and grid element of tube 7, the plate elements of these additional tubes being connected in parallel and supplied with plate current from rectifier 11a, as shown. These additional tubes are not essential to the operation of the circuit but merely provide an amplified indication.

For purposes indicated hereinafter, a resistance 10a is connected in series with the indicating meter 10, and a pair of condensers 10b and 10c are connected in shunt with meter 10 and resistance 10a, as shown, a variable resistance 10d being included in series with condenser 10c. A condenser 6e is also connected between a variable tap on resistance 6b and the lower terminal of resistance 6b.

An oscillating circuit is interposed in the input circuit of vacuum tube 3, and this oscillating circuit comprises a vacuum tube 13 of the pentode type having a cathode, three grids a, b, and c, and an anode d. The current whose periodicity is to be measured is supplied between the cathode and grid c by means of a circuit including a condenser 1a and a resistance 13a. Plate current for tube 13 is supplied from rectifier 11a through a circuit which includes the primary of transformer T, a feed-back coil 13b and an inductance coil 13c, the negative terminal of rectifier 11a being connected to the common cathode lead.

A tuned oscillatory circuit consisting of an inductance coil 13d and a condenser 13e connected in parallel is included in the circuit to grid a, and this grid circuit also includes a high resistance 13f shunted by a condenser 13g. Feedback coil 13b is inductively coupled to inductance coil 13d to produce high frequency oscillations in the circuit, the circuit being tuned to a frequency which preferably is much higher than the frequency to be measured. A grid b of tube 13 is supplied with biasing potential from rectifier 11a, as shown. Resistance 13a connected in series with grid c is sufficiently large to prevent appreciable lowering of the input impedance in case the input signal is large enough to cause flow of electron current to grid c.

Grid c of tube 13 is normally supplied with a negative biasing potential from rectifier 12a through a potentiometer 12e and a high resistance 2a, the biasing potential being sufficiently large to normally prevent self-oscillation of the oscillator. A condenser 13h is connected to by-pass high frequency current around transformer T.

Operation of the arrangement shown in Figure 2 is as follows:

When a signal applied to the input circuit reduces the negative potential on grid c, the oscillator begins to oscillate. The condition of self-oscillation is established very rapidly and is aided by the action of inductance coil 13c. A negative potential is developed on grid a during oscillation due to electron current through the network of resistor 13f and condenser 13g, and this negative potential causes the total electron current through the tube to decrease rapidly to a low value. This total current passes through grid b and plate d and thus through the primary of transformer T. Condenser 13h by-passes the high frequency oscillatory currents around transformer T. The form of the current through the primary of transformer T is shown in Fig. 3, where it will be seen that the current has a relatively high value in the non-oscillatory state and suddenly reduces to a lower value when the condition of oscillation is established, as shown at the point A. This sudden change in the current through transformer T induces a pulse in the secondary of transformer T, and this pulse is passed through a frequency selective network consisting of condenser 1b, resistor 2b and resistor 2c, developing across resistor 2c a pulse of potential as shown at A' in Fig. 4. In a similar manner, when the input signal ceases and allows the oscillator to change from an oscillatory state to a non-oscillatory state, the total current through transformer T will suddenly increase to its former value as shown at B in Fig. 3, and this sudden increase in current will result in establishing a current pulse across resistance 2c of the same shape as pulse A' but of opposite polarity, as shown at B' in Fig. 4.

Thus, the pulse across resistance 2c will be of one polarity for a change from a non-oscillatory state to an oscillatory state and of an opposite polarity for the reverse change. Since the change in current is very rapid the form of the pulse will be independent of the frequency of the input signal and may be made of a much shorter duration than one complete cycle of the input signal.

The pulses of negative polarity only are passed through rectifier tube 2d and thence developed across resistor 2 and applied to the grid of tube 3, thereby producing an amplified positive potential pulse across resistor 4. This positive pulse is transmitted by means of condenser 5, resistor 6a, rectifier 6c and resistor 6b through resistor 6d to the grids of tubes 7, 7a and 7b. The grids of tubes 7, 7a and 7b are normally maintained at a negative potential sufficient in value to prevent a flow of electron current through them, but the transmitted positive pulse permits electron current to flow through tubes 7, 7a and 7b and thus through resistor 10a and meter 10. The electron current flowing through tube 7 develops an amplified negative potential pulse across resistor 8 and this negative pulse is transmitted through condenser 9 to resistor 2 and thence to the grid of tube 3. Since a negative potential pulse applied to grid of tube 3 started the described events, the pulse is self-maintained and grows in size until limited by the characteristics of the tubes used and their associated circuit elements.

After the pulse reaches a limiting size the reverse action takes place automatically and the pulse decreases until the original normal stable condition is reached. Therefore, each cycle of input signal causes a given charge to flow through meter 10, and the total charge per second, or the average value of the current through meter 10 is dependent upon the frequency of the applied signal.

Rectifier 2d prevents any reaction of the self-maintained pulse upon the apparatus initiating it.

Powder supply devices such as 11a and 12a are in common use and usually involve a rectifier and filter assembly. It is well known that the output potentials of such devices vary as the potential applied to them from the alternating current mains varies. This is true even though a so-called regulated power supply device is used as is the case of power supply 11a. Therefore, if the potential delivered by the alternating current mains increases, the potential delivered by power supply 11a increases, as does also the temperature of the cathodes of the vacuum tubes when they are powered from the same alternating current source. For a given frequency of input signal these effects by themselves tend to increase the size of the current pulses through meter 10, thereby giving an erroneous reading. However, an increase of the negative biasing potential applied to the grids of tubes 7, 7a and 7b produces the reverse effect, i. e. decreases the size of the current pulses through meter 10. The potential drop across tube 12c remains substantially constant even though the current through it varies in accordance with the variations in potential of the output of power supply 12a caused by the varying potential supplied by the alternating current mains. Since resistor 12d is connected across tube 12c and a fraction of resistor 12b, the potential across resistor 12d may be made to vary in the same proportion as the potential delivered from power supply 12a varies, or by a smaller proportion according to the position of the tap on resistor 12b. The correct negative operating potential for tubes 7, 7a and 7b is obtained by the adjustment on resistor 12d. Thus an adjustment in the proportion of variation of negative potential, due to an A. C. main potential variation, supplied to tubes 7, 7a, and 7b may be secured which will substantially compensate for any variation in reading of meter 10 due to a variation of cathode temperature or to a variation in output potential of power supply 11a caused by variation in potential of the alternating current supply or to both these effects. In actual practice it was found that for a given frequency of input signal the reading of meter 10 could be kept constant to within 0.2% for a variation of A. C. main supply potential from 90 volts to 130 volts. These figures are only illustrative of the possible stabilizing action.

The size of current pulse per cycle through meter 10 may be varied as a function of the frequency of the applied signal by means of condenser 6e and resistor 10d and condenser 10c. Condenser 6e increases the size of current pulse as the frequency increases. Decreasing the size of resistor 10d tends to decrease the size of the current pulse as the frequency increases. Increasing the value of either condenser 10b or 10c will decrease the size of the pulse. Thus the frequency response characteristic may be made to bend up, to be straight, to bend down, or to be a composite of these effects depending upon the relative values of the components used.

Electronic frequency indicating systems embodying the inventive concept disclosed herein require no conditioning before operation since no current will flow through the indicating meter except when an input signal is applied. The frequency-response characteristic may be varied to fit specialized work and the reading is substantially independent of fluctuations of potential of the alternating current supply when such a supply is used as a primary source of power.

I claim:

1. In a frequency measuring system, the combination of an electron current type tube including a cathode, an anode and at least one grid, an anode circuit for said tube including a source of current, a control circuit for said tube, means for coupling said anode circuit and control circuit to produce self-sustained high-frequency oscillations therein, means responsive to said oscillations for reducing the value of anode current flowing in said anode circuit, means for biasing the grid of said tube to normally prevent oscillations, a source of periodic current whose frequency is to be measured, means for applying said periodic currents to said grid to cause said tube to oscillate for a time during each cycle of said currents, means responsive to changes in said anode current for deriving a uniform current pulse for each current change, and means controlled by said pulses for producing an indication proportional to the time-integrated value of said pulses.

2. In a frequency measuring system, the combination of a vacuum tube oscillator having a grid circuit and an anode circuit coupled to said grid circuit for producing oscillations, means controlled by said oscillations for reducing the anode current of said oscillator, means for biasing the grid of said tube to normally prevent oscillations, a source of periodic current, means for applying said periodic current to said grid to cause said tube to oscillate for a time during each cycle of said current, means responsive to changes in anode current of said tube for producing a uniform current pulse for each change thereof, an amplifier tube having grid and anode circuits, means for biasing the grid of said amplifier tube to normally prevent the flow of anode current, connections for supplying said current pulses to the grid of said amplifier tube to produce an anode current pulse for each positive pulse applied thereto, an amplifying feedback connection from the anode circuit of said amplifying tube to the grid circuit thereof for amplifying said anode current pulses to a predetermined invariable amount, and an indicating meter connected in the anode circuit of said amplifying tube for indicating the average value of the current flowing therein.

DONALD A. WILBUR.